(12) United States Patent  (10) Patent No.: US 6,685,479 B1
Ghaly  (45) Date of Patent: Feb. 3, 2004

(54) PERSONAL HAND HELD DEVICE

(76) Inventor: Nabil N. Ghaly, 14 Longwood Dr., S. Huntington, NY (US) 11746

( * ) Notice: Subject to any disclaimer, the term of this patent is extended or adjusted under 35 U.S.C. 154(b) by 0 days.

(21) Appl. No.: 09/255,644

(22) Filed: Feb. 22, 1999

(51) Int. Cl.[7] ............................................. G09B 19/00
(52) U.S. Cl. .................................................. 434/236
(58) Field of Search ........................... 463/1, 9, 40, 42, 463/36, 35, 30; 273/236–237, 429–431, 459–461; 705/1, 10, 80, 12, 500; 707/9, 10, 3–6; 709/253, 200; 340/146.2, 500, 540, 825, 825.72; 434/236–238, 323, 322, 307 R, 351, 350, 365, 367

(56) References Cited

U.S. PATENT DOCUMENTS 4,348,740 A * 9/1982 White .......................... 434/237
5,086,394 A * 2/1992 Shapira
5,971,855 A * 10/1999 Ng

OTHER PUBLICATIONS

Profile Analysis System Individual Personal Profile Analysis (FAQs) Aron Prints & Associates—Personal ProfileAnalyses (FAQ)—http://mindlink.net/vci/pasppau.htm, 2 pages.
Plus 32 Personality Profile http:// futurecareerdirect.com/plus_Profile.html, 4 pages.
Personality Type Compatibility Excerpt from "The Evolution of Intimate Relationships"—Similarity Sysems http://www.friendshipcenter.com/TEIR/chapters/similarity.php, 2 pages.
Personality Type Compatibility Excerpt from "The Evolution of Intimate Relationships"—Opposite Systems http://www.friendshipcenter.com/TEIR/chapters/opposite.php, 2 pages.
Personality Type compatibility Excerpt from "The Evolution of Intimate Relationships"—Archetypal Systems http://www.friendshipcenter.com/TEIR/chapters/archetypes.php., 2 pages.
Personal Profile System questionnaire copyright, 1990. Carlson Learning Company, 20 pages.
Myers–Briggs Type Indicator–Form G Booklet Consultant psycologists Press, Inc. Copyright© 1984, by Peter B. Myers and Katherine D. Myers—Rev. Dec. 1997, 9 pages.

* cited by examiner

Primary Examiner—Mark Sager

(57) ABSTRACT

A personal hand held play device, method and apparatus, is disclosed which includes means to store personal information related to the player, means to transmit or receive personal information to or from an other device, means to match the stored information with information received, and means to display the results of such a match. One object of the device is to predict the degree of compatibility between two players using stored information related to behavioral patterns and personality profiles. The device also matches areas of common interest between players. In one embodiment, the device functions by requiring the player to select multiple choice answers to stored questions. The answers are then processed and archived in a format compatible to perform a match. In the preferred embodiment, the device displays the results of the match through the use of a plurality of light emitting means in different colors. A plurality of sound effects are also provided to heighten the enjoyment of using the device.

67 Claims, 13 Drawing Sheets

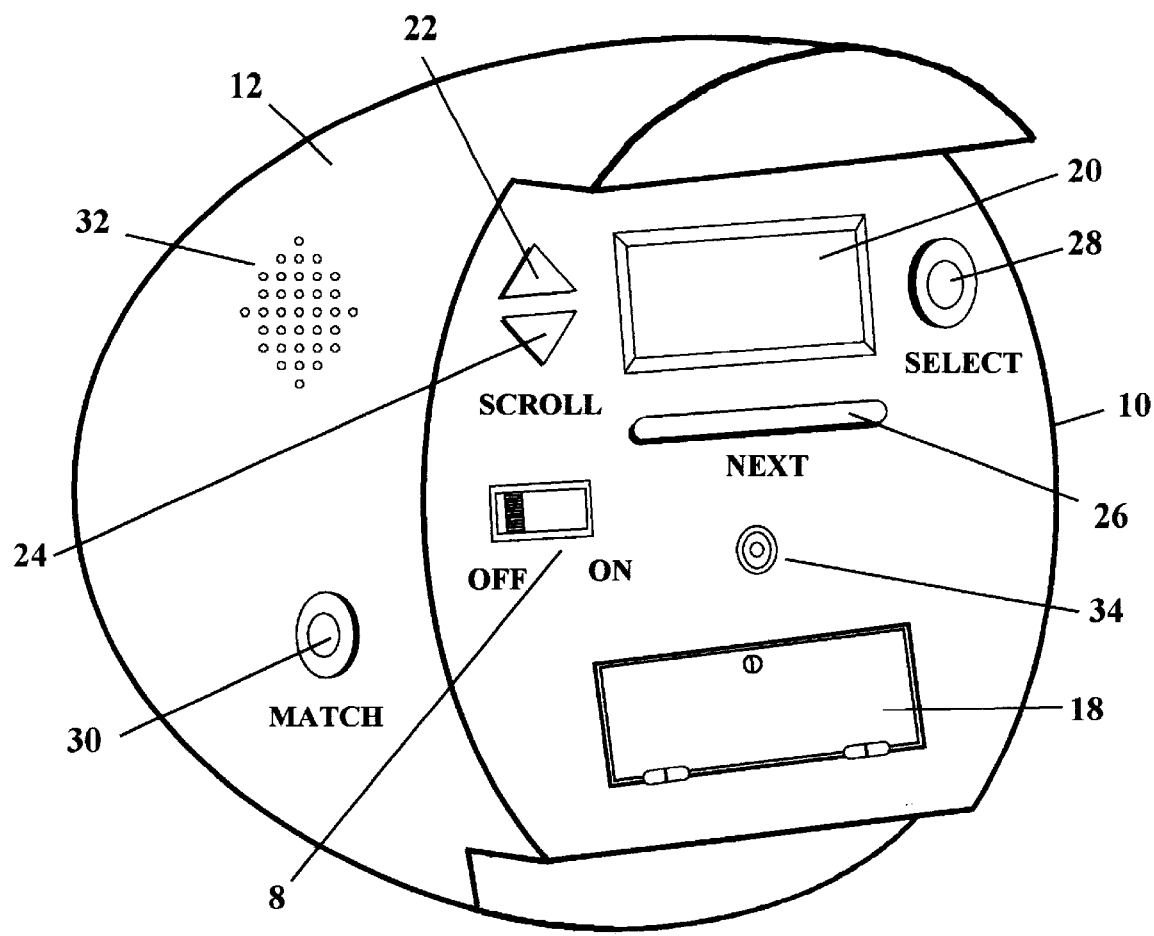
Figure – 1 –

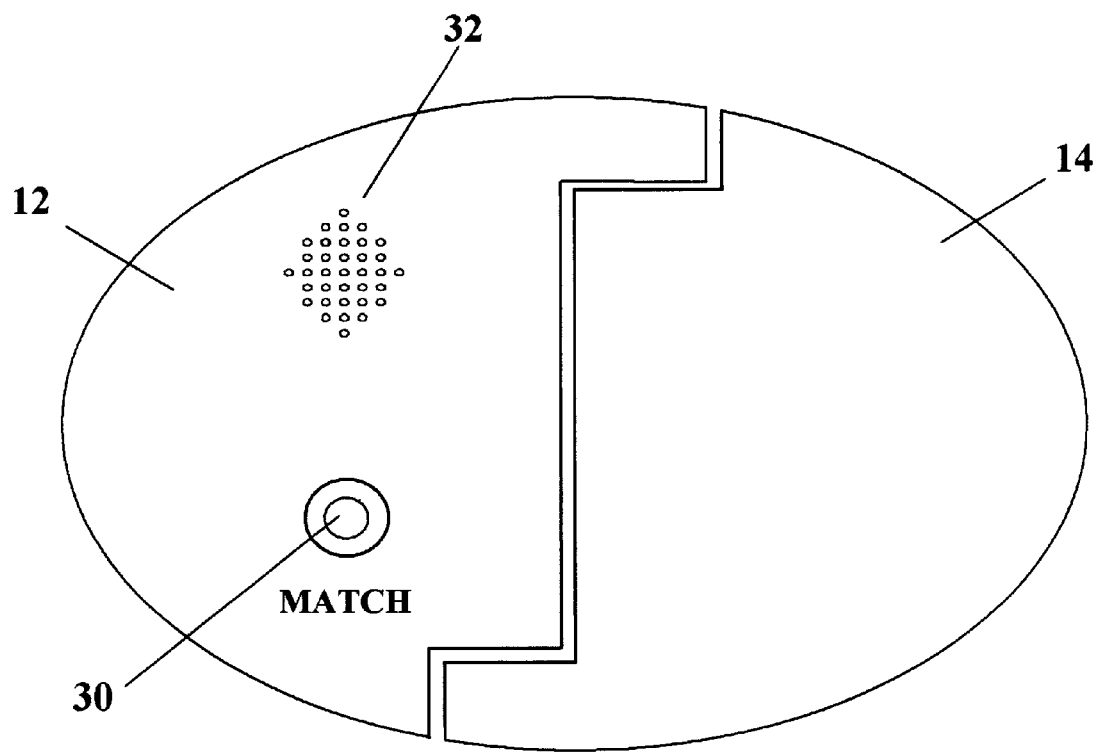
Figure – 2 –

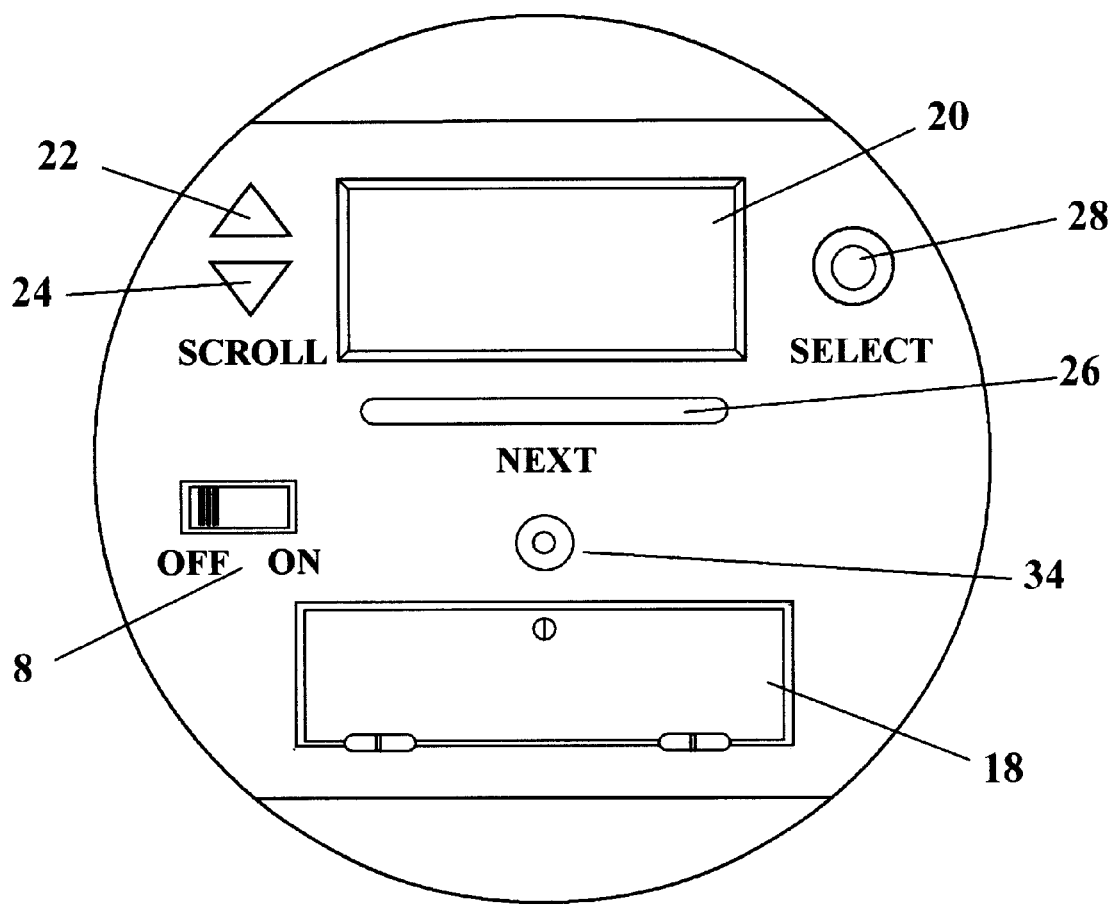
Figure – 3 –

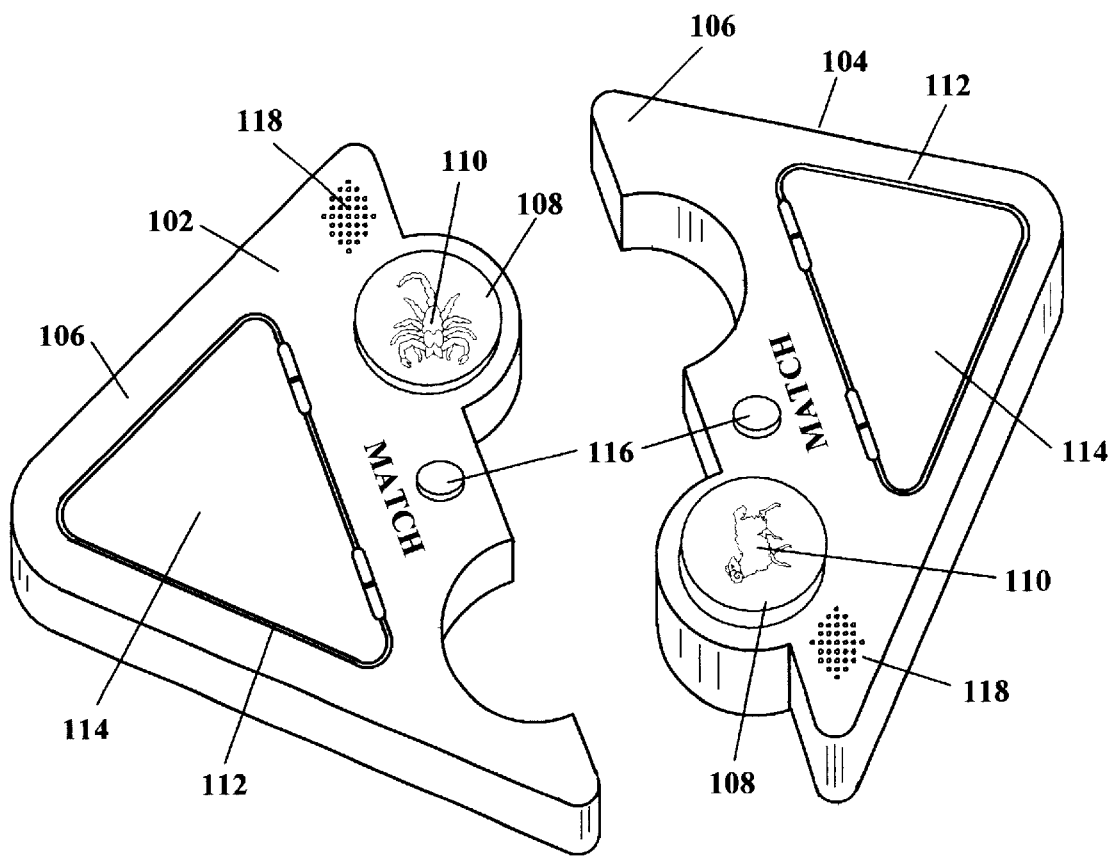
Figure- 4 -

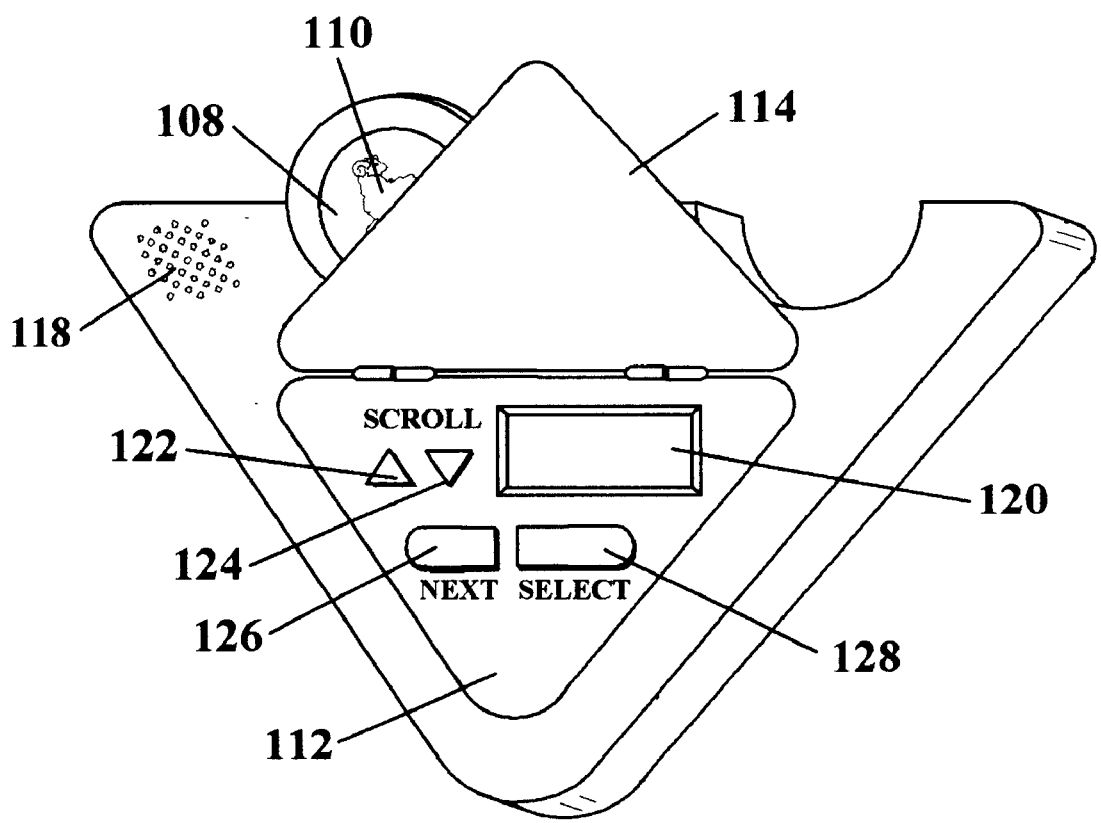
Figure – 5 –

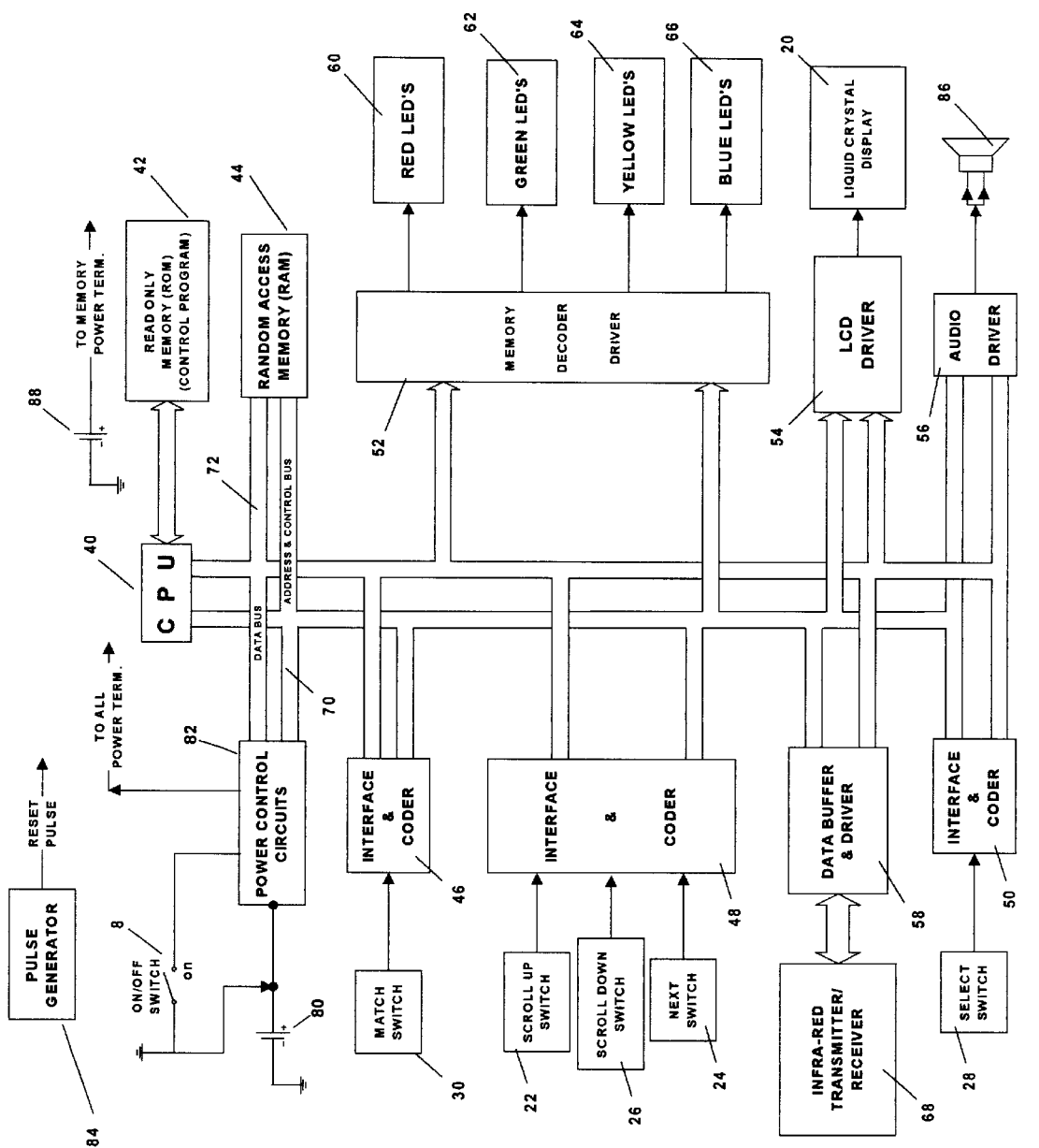
Figure – 6 –

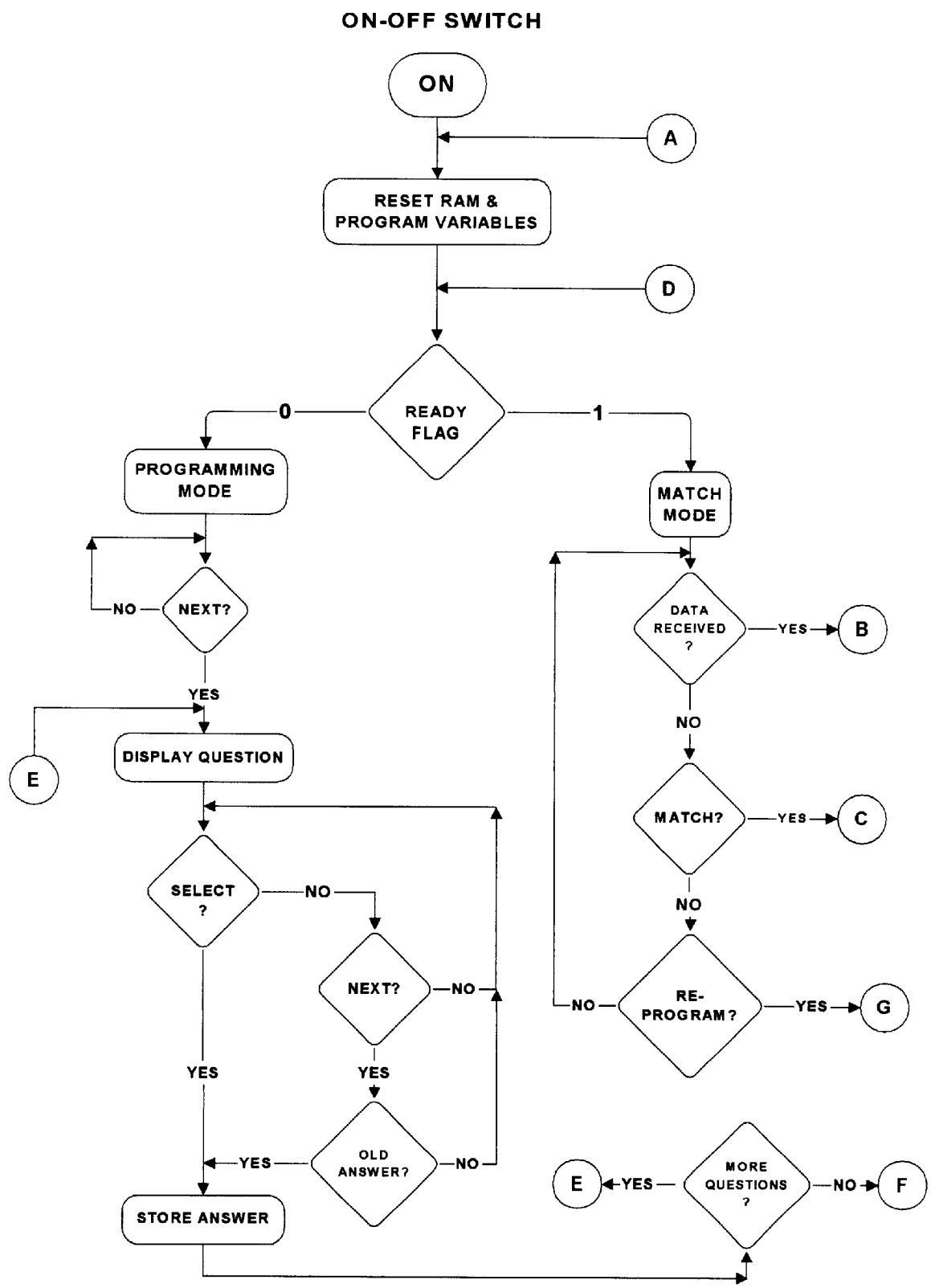
Figure – 7 –

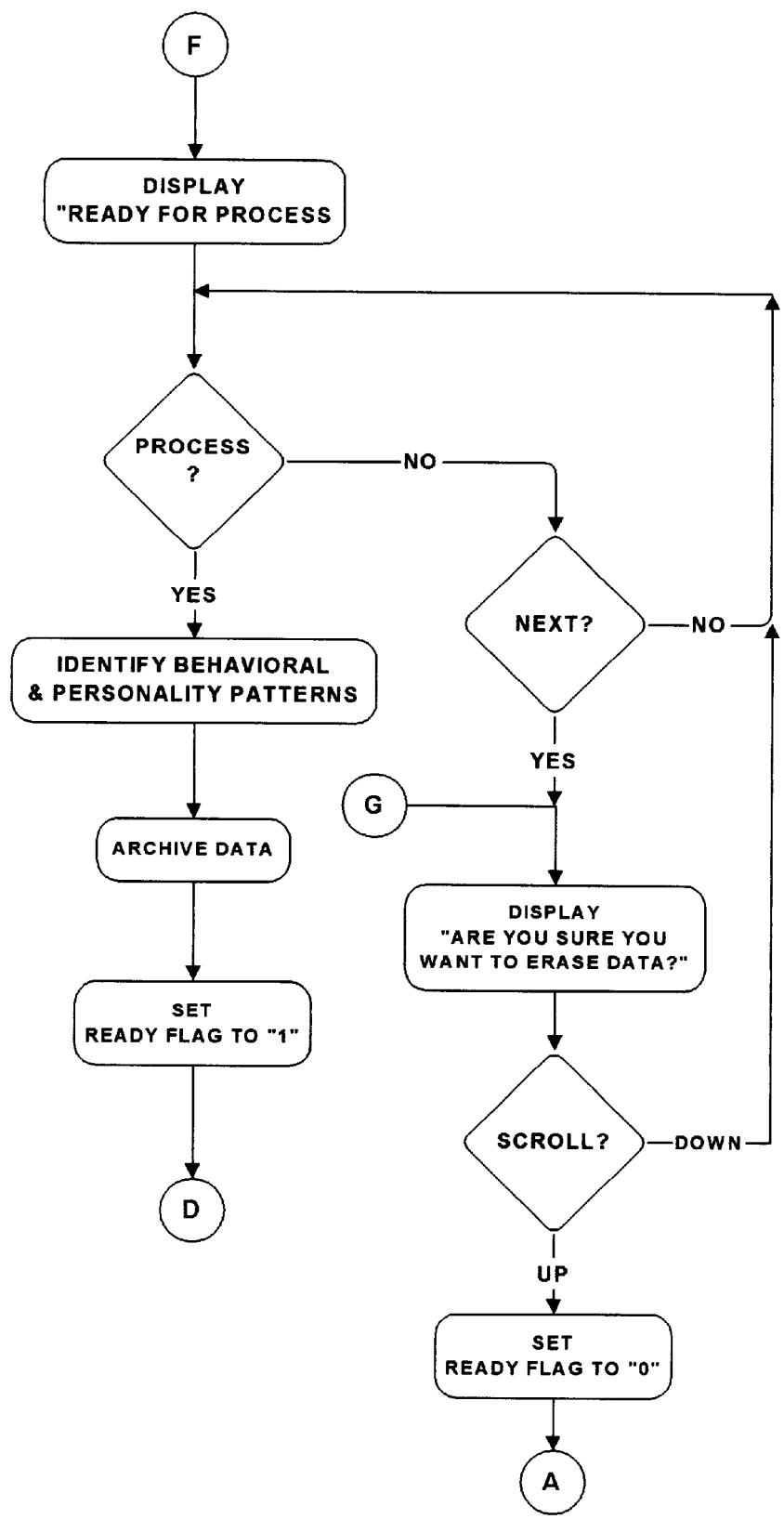
Figure – 8 –

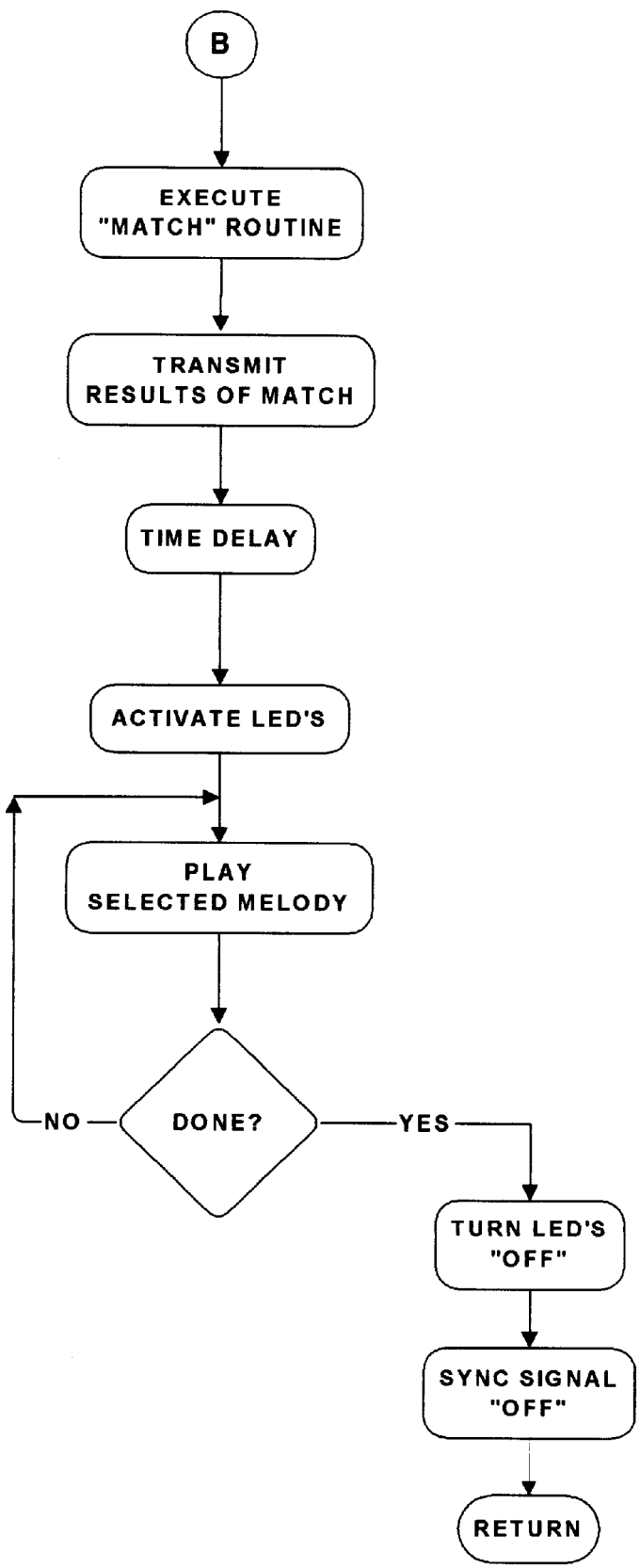
Figure – 9 –

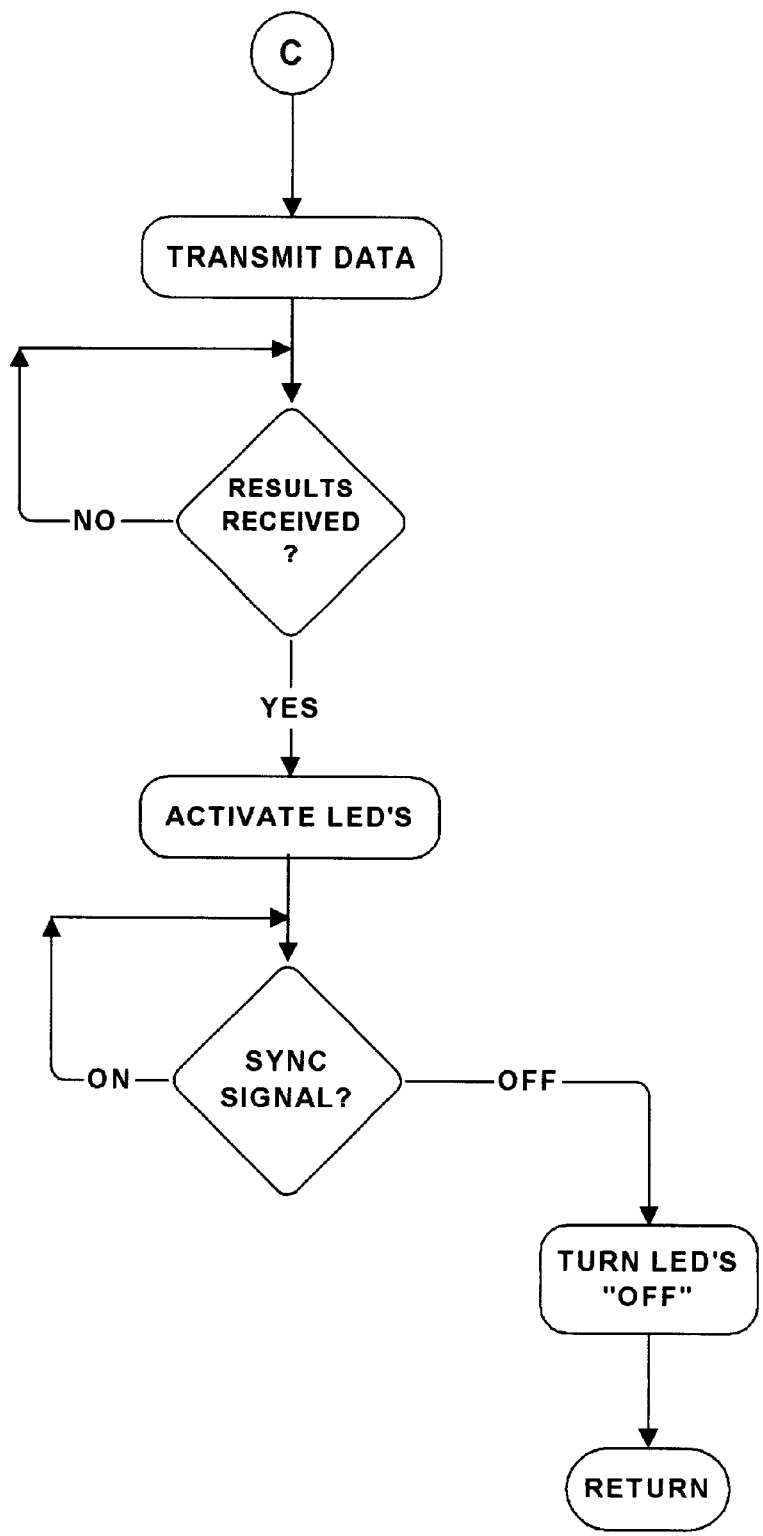
Figure – 10 –

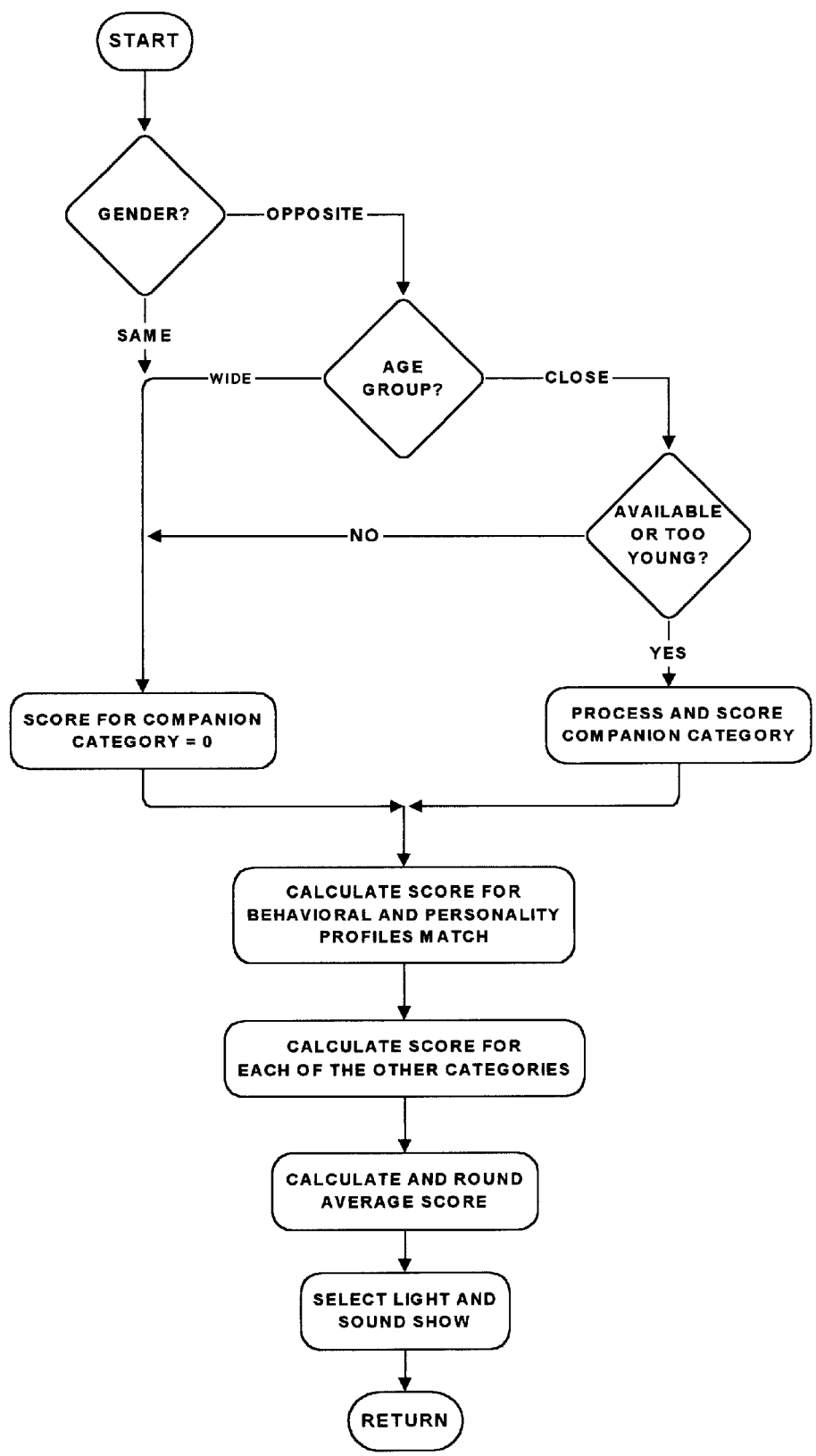
Figure – 11 –

| CATEGORY | ITEM 1 | ITEM 2 | ITEM 3 | ITEM 4 | ITEM 5 | ITEM 6 | ITEM 7 |
|---|---|---|---|---|---|---|---|
| SPORTS | Baseball | Basketball | Soccer | Tennis | Football | Hockey | Swimming |
| TRAVEL | Europe | Far East | Middle East | Cruses | Disney | U.S. | Tropical |
| OUTDOORS | Beach | Picnic | Hiking | Sight Seeing | Camping | Sailing | Skiing |
| FOOD | Italian | Soul | Chinese | Indian | Near East | German | Japanese |
| MUSIC | Jazz | Rock | Pop | Rap | Easy Listening | Vocals | Classical |
| ANIMALS | Dog | Cat | Birds | Fish | Rabbit | Snake | Iguana |
| HOBBIES | Chess | Gardening | Fishing | Reading | Art & Crafts | Cards | Cooking |
| COMPANION | Funny | Talkative | Good listener | Aggressive | Considerate | Outgoing | Passionate |
| SELF ASSESSMENT | Funny | Talkative | Good listener | Aggressive | Considerate | Outgoing | Passionate |
| COLLECTIBLES | Stamps | Coins | Antiques | Porcelain | Cards | Comic books | Paintings |
| NIGHT LIFE | Theater | Disco | Comedy club | Movies | Eating out | Ballet | Concert |
| PRECIOUS THINGS | Family | Money | Good Health | Friendship | Religion beliefs | Tradition | Pets |
| POLITICS | Democrat | Republican | Independent | Liberal | Conservative | Women rights | Civil rights |
| SHOPPING | Flee market | Thrift | Television | Internet | Mail order | Department Stores | Specialty Stores |

Figure – 12 –

Instruction:

Choose one MOST and one LEAST in each of the following groups of words:

| WORD | MOST | LEAST |
|---|---|---|
| Gentle | | |
| Persuasive | | |
| Humble | | |
| Original | | |

| WORD | MOST | LEAST |
|---|---|---|
| Attractive | | |
| God-fearing | | |
| Stubborn | | |
| Sweet | | |

Prior Art in Field of Psychology/ Human Relations

Figure – 13 –

PERSONAL HAND HELD DEVICE

BACKGROUND OF THE INVENTION

For the longest time and in every days life individuals have been interacting with each other forming personal relationships with other individuals based on preferences, mutual interests, personality traits and the like. These relationships usually takes time to develop and within such time an individual would learn, discover and "get to know" the personality, character and interests of other individuals with whom he or she would form relationships.

Many psychologists and others who have studied and researched human behavior have classified and characterized said behavior using a plurality of categories and/or profiles each of which describes and/or relates to a plurality of personality traits. A number of methods have been developed to capture and describe the personality and/or behavior of an individual. Each of these methods is usually based on a questionnaire that includes a plurality of multiple choice questions. An individual is requested to complete the questionnaire by selecting the multiple choice answers that best fit his or her preferences. These answers are processed by assigning a weighting factor to each answer and by classifying and tallying the weighted scores. The score in each category is then used to describe the personality of the individual using a predefined plurality of classifications and indicating the level, degree or rank within each classifications. For example an individual can be characterized as extrovert or introvert; as having a high tendency for control; as not being interested in details; etc. The results of these methods have been used for self development and in team building.

These psychologists and others have also concluded that said classifications and personality traits can be used to predict the level of compatibility between two individuals and how well they would get along. To the inventor's knowledge no device has ever been developed to allow two individuals to instantly ascertain and/or predict the degree to which they are compatible based on their personality traits, mutual interests and the like. Recent advances in microelectronics make the development and construction of such a device possible.

OBJECT OF THE INVENTION

This invention relates to play and fun devices and in particular to a new hand held personal device which is founded on matching personal information pertaining to one individual and stored in one device with personal information pertaining to another individual and stored in an identical or similar device. Accordingly, one object of this invention is to provide a new hand held personal device that would predict compatibility between two individuals and how well their personalities and interests match.

It is another object of this invention to provide a new hand held personal device that would indicate the degree to which two individuals are compatible and how well they will get along.

It is yet another object of the current invention to provide a new hand held personal device that would check the compatibility between two individuals in a number of categories.

It is also an object of this invention to provide a new hand held personal device capable of communicating with a similar device when they are placed in close proximity to each other.

It is still an other object of the current invention to provide a new hand held personal device that includes means to input personal data into the device.

It is yet another object of this invention to provide a new hand held personal device that indicates the degree of compatibility between two individuals using a plurality of colors.

It is also an object of this invention to provide a new hand held personal device that includes a plurality of light emitting means of various colors.

It is yet another object of this invention to provide a new hand held personal device that indicates the degree of compatibility between two individuals using a plurality of audible signals.

It is also an object of the current invention to provide a new hand held personal device that includes means to display a plurality of questions.

It is yet another object of this invention to provide a new hand held personal device that includes entry control means to select or provide answers to questions.

It is also an object of this invention to provide examples of such new hand held personal devices as preferred and alternate embodiments.

It is yet an other object of this invention to provide a new hand held personal device shaped as a heart and subdivided into two parts such that compatibility can be checked by swapping the back parts of two such devices.

It is yet an object of this invention to provide new hand held personal devices in many shapes and colors.

It is still an object of this invention to provide new hand held personal devices having a housing constructed from transparent material to allow light to emit from such housing.

It is also an object of this invention to provide new hand held personal devices having a housing that includes a lens shaped as a heart or any other shape or figure.

It is yet an other object of this invention to provide new hand held personal devices having a housing that includes a removable and replaceable lens that comes in many shapes and/or figures.

It is further an object of this invention to provide new hand held personal devices having shapes such that when two devices are placed together they form a different figure.

It is also an object of this invention to implement the concept of matching personal information between two players by providing software that can operate on personal computer devices which communicate over a variety of networks.

It is a further object of this invention to provide a new hand held personal device in many shapes and having such a small size such that it may be attached to a key chain or mounted on a necklace.

It is another object of the invention to achieve the above objectives in an economical and easy to implement fashion.

BRIEF SUMMARY OF THE INVENTION

The foregoing and other objects of the invention are achieved in accordance with one preferred embodiment of the invention by providing a hand held device that comprises a micro-processor, a plurality of switches to control the device, to allow selection of answers, or to provide answers to stored questions, an LCD screen, a plurality of light emitting means in different colors, an infra-red transmitter/receiver and means to generate sound effects. The device operates in two modes: Programming mode and Match mode.

In the Programming mode, the player will enter his or her answers to a plurality of questions. The device will query such answers by displaying a sequence of questions including questions with multiple choice answers. The player will select and/or provide the correct answer such as gender, age category, marital status, ethnic background, educational achievements and the like. The player will also select his or her personal preferences to a plurality of questions related to hobbies, interests, skills, sports, and the like. Further the player will select answers that best fit his or her personality profile in connection with multiple choice questions dealing with personality traits and characteristics. Upon completing the answering of questions, the player may initiate the processing of the personal data entered by depressing the Process/Match button. Said processing of personal data consists of grouping and archiving the data into a plurality of categories and identifying the personality traits and profiles of the player based on predefined classifications. Only after such processing of data can the device be switched to the operating or Match mode.

In the operating mode, the device is ready to match the personality profile and other personal information of the player with those of another player. The matching process occurs in two different ways: "Receive-Process-Transmit" or "Transmit-Process-Receive." The default operation of the device is to be in a receiving standby mode until it receives data from a similar device with a request to match. Upon receiving the data, the device will match the personality profile and other personal information of the "guest" player with those of the "host" player. Said matching is based on identifying areas of common interest and the degree of compatibility between the two personality profiles.

The results of the matching process will then be transmitted back to the host device together with a synchronization signal to enable the two devices to simultaneously display the results. Upon receiving the synchronization signal, the two devices will display a sound and light show that represents the results of the match. Such a sound and light show will continue for a predetermined period of time after which the device will return to a receiving standby mode. One example to represent the result of the match is to use various colors of the rainbow spectrum. In such an example the "red" color is one extreme on the spectrum that represents the highest matching score possible. Conversely, the "blue" color is the opposite extreme on the spectrum that represents the lowest matching score possible. Other colors and shades will indicate matching scores between the two extremes. Similarly, sound effects may range from a buzzer for a negative match to a siren for a high scoring match. Alternatively, sound effects may include a plurality of melodies each of which is associated with a specific result of the match.

The second manner to perform the matching process is initiated by the player through the activation of the Process/Match button. Upon such activation, the device will transmit the personality profile and other personal information of the player to a "host" device with a request to match. The "host" device will execute the match process and will transmit the results back with a synchronization signal. Upon receiving the results, the device will initiate a light and sound show that corresponds to or represents the results of the match.

The foregoing objects of the invention can also be achieved in accordance with an alternate embodiment of the invention. In such an alternate embodiment, each device comprises two main parts: a base and a detachable part or removable piece. The functionality's of the overall device are similar to those of the preferred embodiment, except that the functionality's are divided between the base and the detachable part or removable piece such that the functions related to the programming mode are performed by the base, and the functions related to the operating mode are performed in the detachable part. Accordingly, the base comprises of a plurality of switches to control the device, to allow selection of answers, or to provide answers to stored questions, an LCD screen and connections to the microprocessor which is located in the detachable part. In addition to the micro-processor, the detachable part or removable piece includes a plurality of light emitting means of different colors, an infra-red transmitter/receiver and means to generate sound effects. Under such an alternate embodiment, it is possible to miniaturize the size of the removable piece such that it can be mounted on a necklace or attached to a key chain.

A second alternate embodiment includes a removable lens to personalize the device to the player. The lens comes in many different shapes, such as a heart, zodiac signs, sport symbols or any other shape. The player would be able to purchase a plurality of lenses and use them with the device.

Further, the foregoing objects of the invention can be achieved in accordance with other embodiments of the invention. Such embodiments are based on variations of the aforestated description of the preferred and alternate embodiments. For example, the invention can be implemented using software designed in accordance with the invention. Said software will utilize a personal computing device or the like to store personal information about the player. This information can then be communicated to a second player via the Internet, or over any other type of communication network, for processing by the second player's personal computing device. The results can then be shared and displayed by the two computing devices. Other variations include providing each player with a set of written questions and then requesting the player to enter the answers in a particular sequence rather than having the device query each answer by displaying the questions one at a time. In addition, the query of information, including displaying questions and entering answers can be accomplished using a separate computing device such as a personal computer. Upon providing all the answers to the predefined questions, such information can then be copied to a hand held personal device either through a serial cable interface or by the way of infrared communication. An other variation would require the storing of information on a programmable memory device that can be plugged in a hand held personal device. Yet an other variation is to use the device to match specific situations based on a set of questions. In such a case, a new set of questions and associated multiple choice answers, based on said specific situation, can be down loaded and stored in the device. The device can also be used to store personal, educational, work experience and other information related to the player for possible match with an other master device that includes information about available jobs or positions.

The device can be constructed in many figures and colors, the most desirable figure is for the device to have a symmetrical shape such that when two devices are placed together they form a different shape or figure. Further, and as described in an alternate embodiment, it is desirable to personalize the device. One example would be to provide a housing with a lens that emits light generated by the device. Such a lens can be removable and interchangeable with lenses of different shapes. Said shapes may include the heart shape, sport symbols, zodiac signs, animal shapes, or the like.

BRIEF DESCRIPTION OF THE DRAWINGS

The foregoing summary, as well as the following detailed descriptions of the preferred and alternate embodiments of the invention, will be better understood when in conjunction with the appended drawings, it being understood, however, that this invention is not limited to the precise arrangements illustrated in the drawings.

FIG. 1 is a perspective view of the preferred embodiment of a device according to the invention.

FIG. 2 is a front view of two devices build in accordance with the preferred embodiment and placed side by side to form a symmetrical egg shape.

FIG. 3 is a side view of the device build in accordance with the preferred embodiment showing an LCD screen, On/Off switch, various switch controls, battery compartment and Infra-Red lens.

FIG. 4 is a perspective view of an alternate embodiment showing two devices with their control compartments in the closed position and the removable lenses indicating zodiac signs.

FIG. 5 is a view of a device constructed in accordance with the alternate embodiment showing an open cover exposing an LCD screen and various switch controls.

FIG. 6 is a block diagram of the control circuits and main elements utilized by the present invention.

FIGS. 7 & 8 is a logical flow diagram illustrating the main program functions performed by the microprocessor controlling the device according to the invention.

FIG. 9 is a logical flow diagram illustrating the main functions of the "Receive-Match-Transmit" routine.

FIG. 10 is a logical flow diagram illustrating the main functions of the "Transmit-Match-Receive" routine.

FIG. 11 is a logical flow diagram illustrating the main functions of the "Match" routine.

FIG. 12 is a tabulation showing examples of specific categories and elements used to check compatibility between players.

FIG. 13 shows examples of multiple choice questions used to determine the behavioral pattern and personality profiles of the player.

DETAILED DESCRIPTION OF THE PREFERRED EMBODIMENT

Referring now to the drawings where the illustrations are for the purpose of describing the preferred embodiments of the invention and are not intended to limit the invention hereto. FIG. 1 is a perspective view of a personal hand-held device 12 comprised of a housing 10 shaped as a part of a symmetrical egg such that when an identical device 14 is placed next to the first device 12, the resulting shape is a symmetrical egg. FIG. 2 shows a front view of the two devices 12 & 14 placed side by side to form a symmetrical egg. FIG. 3 is a side view of the preferred embodiment showing an LCD screen 20, the On/Off switch 8 and a plurality of controls: "UP" and "DOWN" scroll buttons 22 & 24, "NEXT" button 26, "SELECT" button 28, and an Infra-Red LED lens 34 for two-way communications with a similar device. On the external surface of the device there are the "MATCH" or PROCESS button 30 and perforations 32 to permit sounds from the loudspeaker 86 to issue from the housing 12. The external surface of the device is constructed using a transparent material to allow light from a plurality of colored LED's 60, 62, 64 & 66 to issue from the housing.

A block diagram of the control circuitry for this hand held personal device 10 is illustrated in FIG. 6. This control circuitry includes a central processing unit 40 having a control program memory 42 associated therewith, a read only memory (ROM) 42, a random access memory (RAM) 44, a plurality of interface and coding devices 46, 48 & 50 and a memory decoder driver 52, an LCD driver 54, an audio driver 56 and a data buffer 58. The interface and coding devices 46, 48 and 50 are used as input interface between the control push buttons with the central processing unit 40. As such, interface and coding device 46 is associated with the MATCH switch 30; interface and coding device 48 is associated with the Scroll UP 22, Scroll DOWN 24 and NEXT 26 switches; and interface and coding device 50 is associated with the SELECT switch 28. Similarly, the memory decoder device 52 is used as an output interface between the central processing unit 40 and plurality of colored indicators: red LED 60, green LED 62, yellow LED 64 and blue LED 66; the LCD driver 54 is used to interface the CPU 40 with the Liquid Crystal Display 20; the audio driver 56 is used to interface the CPU 40 with the loudspeaker 86 and the data buffer 58 is used to interface the central processing unit 40 and the Infra-Red Transmitter/Receiver 68. A common address and control bus 70, and a separate common data bus 72 are used to interconnect the central process unit 40 with the interface and coding devices 46, 48, 50, data buffer 58, the memory decoder driver 52, the LCD driver 54, the audio driver 56, the read only memory (ROM) 42, and the random access memory (RAM) 44.

The central processing unit 40 controls the flow of all information throughout the entire device under the direction of the control program. The control program resides in the read only memory (ROM) 42.

A plurality of dry cell batteries 80 is positioned in the housing, these batteries 80 providing power for the central processing unit 40 as well as the plurality of indicators 60, 62, 64 & 66. These main batteries can be accessed from the side of the device through a cover 18. In addition to the main operating batteries 80, an auxiliary battery 88 is used to maintain the memory circuits energized during any time when the main batteries are not available. An on/off toggle switch 8 is provided to control the operational state of the device and the connection of the internal battery supply 80 to the electric circuitry through the power control circuits 82. The power control circuits 82 provides the desirable feature of turning off the mail battery power if the device is idle for a predetermined period of time. A loudspeaker 86 is positioned in the middle portion of the housing and perforations 32 are provided to permit sounds from the loudspeaker 86 to issue from the housing.

With respect to the operation of the device, the logic steps utilized are illustrated in flow diagram form in FIGS. 7 through 11, which interconnect with each other at the places shown in the various figures. Even though specific reference will not be made to this diagram in the following description of the operation of the device, periodic reference to this diagram may prove to be helpful to the reader hereof.

Referring again to FIG. 7, in order to operate the device, the player moves the off-on switch 8 from the "off" position to the "on" position which causes power to be supplied to all terminals of the device 12 from the internal battery 80 and which causes a pulse generator 84 to generate a reset pulse. This pulse is applied to the central processing unit 40 and causes the central processing unit 40 to clear any data remaining in the RAM 44, in the memory decoder driver 52, in the LCD driver 54, in the audio driver 56, and in the data buffer 58 over the common data bus 72. The pulse also causes the central processing unit 30 to check the ready flag. If the ready flag is set to "1," then the device will switch to the operating mode. Conversely, if the ready flag is set to "0," then the device will switch to the programming mode. In the programming mode, the device will display "Programming Mode" on the LCD screen. The player will be instructed to depress the NEXT button 26 to display the first question and associated answers. If an answer was selected previously by the player for that question, such an answer will be shaded. The player may then activate the scroll buttons UP 22 or DOWN 24 to select a different answer, or the player may depress the SELECT 28 push button to select the shaded answer. The player may also depress the NEXT 26 push button to select the shaded answer and move on to the next question. Conversely, if an answer was not previously selected for that question, no shaded answer will be provided, and the player may use the scroll UP button 22 or DOWN button 24 to select an answer. The player may then activate the SELECT button 28 to select an answer, or he or she may depress the NEXT button 26 to select an answer and move on to the next question. This process will continue until the device makes a determination if the last question has been reached. Upon such a determination, the device will display "Ready for Process" on the LCD screen 20. If the player activates the MATCH (PROCESS) push button 30, the processing of data will take place resulting in computations, classification and archiving of the answers. On the other hand, if the player activates the NEXT push button 26 and upon confirmation, the process of displaying questions and selecting answers will repeat starting with question number 1. Upon the completion of the processing of data, the ready flag will be set to "1," and the device will be switched to the Operating mode ready to perform a match.

The processing of data consists of identifying the behavioral pattern and personal profile of the player. This is done based on algorithms including counting certain categories of answers, allocating weighting factors to such categories and calculating the player's score in various classifications which identify profile or behavioral patterns. An example of such profile determination is known as the DISC dimensions of behavior. See Personal Profile System, Copyright, 1990. Carlson Learning Company.

The archiving of data consists of organizing the answers to describe and identify the player in terms of gender, age group, ethnic background, education level, hobbies, interests, and the like. For the purpose of demonstrating this invention, the preferred embodiment provides examples of categories and specific items that can serve as the basis for determining the degree of compatibility between two individuals. It should be clearly understood that the selection of such categories and specific items is for the purpose of describing the preferred embodiment and is not intended to limit the invention hereto. As will be understood by those skilled in the art, modifications, additions and/or selection of different categories and/or items will all fall within the scope and intent of this invention. The specific categories identified in the preferred embodiment consist of: sports, travel, hobbies, food, animals, collecting items, games, outdoors, desired characteristics of companion, music, movies and novels. In each of these categories, specific items are queried by the device. For example in the sports category, the player is asked if he or she would like to watch and/or play Tennis, Basketball, Soccer, Baseball, Football, Hockey, Ice Skating, Swimming and the like. In the Music category, the player is asked if he or she would like to listen to music and the type of music he or she likes. A proposed set of categories and specific items within each category is shown in FIG. 12. It should be clearly understood that the inclusion of the categories and specific items identified in FIG. 12 is for the purpose of describing the preferred embodiment and is not intended to limit the invention hereto. As will be understood by those skilled in the art, modifications, additions and/or selection of different categories and specific items will all fall within the scope and intent of this invention. Further, such categories and specific items can be selected and provided to the player from a large data base stored in the device based on age group, gender, special interest or the like. For example, children under the age of 12 may be limited to certain categories and items. Such limitation can be accomplished automatically by the device or by providing special devices for children.

In the Match mode, the CPU will continuously check for either a receipt of data from a similar device, the activation of the MATCH push button 30, or for the simultaneous activation of the UP and DOWN Scroll buttons to reprogram the device. When the device is placed at close proximity to a similar device, hereinafter referred to as "Guest" device, and upon sensing reception of data, the CPU will perform the "Receive-Match-Transmit" routine shown in FIG. 9. Conversely, upon sensing the activation of the MATCH push button 30, the CPU will perform the "Transmit-Match-Receive" routine shown in FIG. 10.

Referring now to FIG. 9, and upon receiving the entire data set from a Guest device, the CPU 40 will commence the processing of the Match routine shown in FIG. 11. Upon the completion of such routine, the CPU 40 will transmit the results using the Infra-Red Transmitter/Receiver 68 to the Guest device. The transmitted data packet includes the identity of the light show to be displayed and a synchronization signal that controls the activation of the display in the Guest device. In this mode of operation, no sound will be generated from the Host device. Simultaneously with the transmission of the synchronization signal, the CPU 40 will select the light/sound show corresponding to the results of the Match from the ROM 42. After a short time delay to allow for the activation of the light show at the Guest device, the CPU 40 will energize the colored LED's 60, 62, 64 & 66 to generate the color corresponding to the match. Also, the CPU 40 will generate either sound effects or a melody appropriate with the match. Upon completion of the melody or after a short sound effect, the synchronization signal will be turned off to terminate the display at both devices. Each of the two devices will then be ready for another match. It should be clearly understood that this specific "Receive-Match-Transmit" routine is for the purpose of describing the preferred embodiment and is not intended to limit the invention hereto. As will be understood by those skilled in the art, modifications, additions and/or selection of different logic steps or variations in the functionality of this routine will all fall within the scope and intent of this invention. For example, generating sound effects from the Host device, interactive display of light and sound by the two devices such that parts of a melody will be generated by one device and remaining parts by the other device, flashing of colored lights, synchronization signals by both devices to terminate the display as soon as the devices are separated over a certain distance, and/or any other variation or modification is within the scope and intent of this invention.

Referring now to FIG. 10 and upon activating the MATCH push button 30, the CPU will commence the transmission of a data packet that includes processed and archived personal data of the player. Upon successful completion of the transmission, the device will idle awaiting the results of the match performed by the "Host" device. Said match is based on the Match routine shown in FIG. 11. Upon receiving the identity of the light show, which corresponds to the results of said match, from the Host device, the CPU 40 will retrieve the color of the display from the ROM 42. Upon receiving the synchronization signal, the CPU will energize the colored LED's 60, 62, 64 & 66 to generate the color retrieved from ROM. Such a color will be displayed until the synchronization signal is turned off by the Host device. Using four basic colors: red, green, yellow and blue, the CPU can generate any color in the spectrum by mixing these basic colors in various intensities to obtain the desired color. It should be clearly understood that this specific "Transmit-Match-Receive" routine is for the purpose of describing the preferred embodiment and is not intended to limit the invention hereto. As will be understood by those skilled in the art, modifications, additions and/or selection of different logic steps or variations in the functionality of this routine will all fall within the scope and intent of this invention. For example, generating sound effects from the Guest device, interactive display of light and sound by the two devices such that parts of a melody will be generated by one device and the remaining parts by the other device, flashing of colored lights, synchronization signals by both devices to terminate the display as soon as the devices are separated over a certain distance, and/or any other variation or modification is within the scope and intent of this invention.

Referring now to FIG. 11, for the logic steps utilized in the Match routine. Upon the activation of the MATCH push button 30 in either of the Host or Guest devices, and upon the transmission of data from one device to another, the logic steps of the Match routine will be performed. The Match routine consists of a number of tasks. The first task will be performed if the two players are from opposite genders and within the same age group. The dominant category in this task is "desired characteristics of companion." An algorithm will check for a match in the desired characteristics specified by the two players. Said algorithm consists mainly of the ratio of attributes satisfied versus specified attributes. The highest scoring match is 10 and the lowest scoring match is 0. Next, the behavioral and personality profiles of the two players will be matched. The algorithm used in this task is based on statistical models using historical research data on how the various personality profiles interact with each other. Similar to the first task, the scoring match will range from 0 to 10. Next, for each of the categories identified in the questions, a match of the common items of interest in the category will be calculated. For example, in the sport category, the number of common sports identified by both players divided by the total number of sports identified by the two players will be used as the measure of compatibility in this category with a possible score between 0 and 10. This process will be repeated for all listed categories. The final score is based on averaging the various scores calculated in the Match routine.

Referring now to FIG. 13, for an example of the questions and associated multiple choice answers which are used to ascertain behavioral patterns and personality profiles. These specific examples were developed by the Carlson Learning Company and have been used for self assessment and team building. It should be clearly understood that the inclusion of such specific examples listed in FIG. 13 is for the purpose of describing the preferred embodiment and is not intended to limit the invention hereto. As will be understood by those skilled in the art, modifications, additions and/or selection of different personal profile system will all fall within the scope and intent of this invention. Further, some of these personal profile systems are protected by Copyright Laws and must be licensed before they are used in the device.

For the purpose of displaying the results, the preferred embodiment provides eleven (11) different light/sound shows. Each of said shows corresponds to each of the scores of 0, 1, 2, . . . , 9, 10, with "10" being the perfect matching score or "Red Hot" and "0" being the lowest matching score or "Ice Cold Blue." The scores between "0" and "10" will be represented by shades in the color spectrum between pure Blue and pure Red. Similarly, sound effects and/or melodies will be provided to correspond to each of the scores. For example a Siren sound effect may correspond to a perfect score while a Buzzer sound effect will correspond to the lowest score. Accordingly, the results of the Match will be rounded to the closest integer from 0 to 10, and for each of said integers a color, a sound effect and/or a melody are stored in ROM 42. Therefore, the display process is a mere selection of a color, a sound effect and/or melody stored in ROM 42. It should be clearly understood that this specific Match routine is for the purpose of describing the preferred embodiment and is not intended to limit the invention hereto. As will be understood by those skilled in the art, modifications, additions and/or selection of different logic steps or variations in the functionality of this routine will all fall within the scope and intent of this invention. For example, displaying the results of each category separately, calculating the final average score using weighting factors, selecting different methods and/or algorithms to describe and match personality and behavioral profiles, providing more or less than the stated eleven (11) light/sound shows, providing more elaborate light and sound effects including flashing lights, dancing lights, flickering lights, synchronized light and sound effects, providing vibrating elements within the devices, and/or any other variation or modification is within the scope and intent of this invention.

DETAILED DESCRIPTION OF AN ALTERNATE EMBODIMENT

The foregoing objects of the invention can also be achieved in accordance with an alternate embodiment by providing a hand held personal device having a triangular shape and which can be personalized by the player. Referring to the drawings where the illustrations are for the purpose of describing an alternate embodiment of the invention and are not intended to limit the invention hereto, FIG. 4 is perspective view of two devices 102 & 104 build in accordance with the an alternate embodiment. Each of these two devices has a triangular shaped housing 106 such that when the two devices are placed side-by-side a square shape is formed. On the surface of each device are a replaceable transparent lens 108 having a customized design 110, a compartment 112 having a cover 114 to house a plurality of controls and an LCD screen. The "MATCH" push button 116 and perforations 118 to permit sounds from the loudspeaker 86 to issue from the housing are also mounted on the surface of the device. FIG. 5 shows a perspective view of the device with an open cover 114 exposing the LCD screen 120, the "UP" and "DOWN" scroll buttons 122 & 124, the "NEXT" button 126, and the "SELECT" button 128. The Infra-Red LED lens for two-way communications is placed on the side of the device and the On/Off switch is placed on the back of the housing. The main feature of this alternate embodiment is the replaceable lens cover 108, allowing the player to choose his or her design 110 such as a Zodiac sign, a sport symbol or the like. The operation of the device constructed in accordance with this alternate embodiment is identical to the operation of the hand held personal device described in the preferred embodiment. The alternate embodiment utilizes the block diagram disclosed in FIG. 6 and the logic flow charts disclosed in FIG. 7 through FIG. 11.

As will be understood by those skilled in the art, additional alternate embodiments may come in different shapes and colors. Further, many different embodiments may be based on the block diagram disclosed in FIG. 6, and/or the logical flow charts disclosed in FIG. 7 through FIG. 11. These logical flow charts are only one example of how to implement the new general concept of matching the personality profiles and other personal data pertaining to two individual players. Furthermore, many programs may be utilized to implement the flow charts disclosed in FIG. 7 through FIG. 11. Obviously these programs will vary from one another in some degree. However, it is well within the skill of the computer programmer to provide particular programs for implementing each of the steps of the flow charts disclosed herein. Further, the concept of matching personal information between two individuals to predict the degree of compatibility between them can be expanded to other applications. For example, the device can be used to screen a plurality of position or employment opportunities using specialized software and stored information related to the educational background, work experience, skills and other personal information of an individual It is also to be understood that the foregoing detailed description has been given for clearness of understanding only and is intended to be exemplary of the invention while not limiting the invention to the exact embodiment shown. Obviously certain subsets, modifications, simplifications, variations and improvements will occur to those skilled in the art upon reading the foregoing. For example, means of providing data communication other than the referenced Infra-Red Transmission/Receiver 68 may be used such as Radio Frequency communication, magnetic coupling or the like. It is, therefore, to be understood that all such modifications, simplifications, variations and improvements have been deleted herein for the sake of conciseness and readability, but are properly within the scope and spirit of the following claims.

What is claimed and desired to be secured by letters of patent is:

1. A device for determining, a degree of compatibility between a first set of data corresponding to a first person and a second set of data corresponding to a second person comprising:
    a. means for storing data,
    b. means to control the operation of the device,
    c. first program segment to process the first set of data, in accordance with a personal profile system, to produce a first user profile data from said first set of data prior to performing a match with data corresponding to a second person and received from another device,
    d. means to communicate stored and produced data to or from another device,
    e. means to compare or match stored and produced data corresponding to the first person with the stored and processed data corresponding to the second person, and received from another device, for the purpose of determining a degree of compatibility between the two persons, and
    f. means to display results of matched sets of data.

2. A device as recited in claim 1 further comprising a housing.

3. A device as recited in claim 2 further comprising a Liquid Crystal Display.

4. A device as recited in claim 2 wherein said housing comes in a plurality of shapes.

5. A device as recited in claim 4 wherein said plurality of shapes includes two parts that when put together will result in a singular form or shape.

6. A device as recited in claim 5 wherein said singular form or shape is configured as a symmetrical egg, a sphere, a heart, a disc, a pyramid or a cube.

7. A device as recited in claim 1 further comprising control means to enter information.

8. A device as recited in claim 7 wherein said control means to enter information includes means to select answers to a plurality of questions.

9. A device as recited in claim 8 wherein said plurality of questions is stored in computer memory within the device.

10. A device as recited in claim 1 further comprising means to download a plurality of questions and multiple choice answers for storage in the device.

11. A device as recited in claim 1 that operates in a plurality of operating modes.

12. A device as recited in claim 11 wherein said plurality of operating modes includes programming mode and match mode.

13. A device as recited in claim 1 wherein said means to compare and match data includes an algorithm that matches personal data, which includes gender, age group, marital status, ethnic background, education level, religion, political affiliation, hobbies, sports, music, art, travel and/or personality preferences.

14. A device as recited in claim 1 wherein said first program segment is based, in part, on algorithms to study or analyze human behavior.

15. A device as recited in claim 1 wherein said means to match and compare data includes an algorithm that calculates the number of common items of interest for each of a plurality of categories.

16. A device as recited in claim 1 wherein said means to display results of matched sets of data includes light emitting means.

17. A device as recited in claim 1 wherein said means to display results of matched sets of data includes a loudspeaker that generates sound effects.

18. A device as recited in claim 1 wherein said means to communicate data includes infrared transmitter/receiver, Radio Frequency transmitter/receiver, or Magnetic Coupling modules.

19. A device as recited in claim 1 wherein said means to communicate data includes communications over a data network.

20. A device as recited in claim 1 wherein said means to control the operation of the device includes a plurality of push buttons, a keypad, or a keyboard.

21. A device as recited in claim 1 wherein said first set of data includes data related to various areas of interest to the person using the device.

22. A device as recited in claim 1 wherein said means to compare or match stored and produced data is based, in part, on calculating the common items between desired and derived personality attributes.

23. A device for determining a degree of compatibility between a first set of data corresponding to a first person and a second set of data corresponding to a second person comprising:
    a. a housing,
    b. a plurality of push buttons to enable a person to interact with, or operate the device, c. a microprocessor to control the operation of the device, d. computer memory to store data belonging to the user of the device and including desired personal attributes, e. a first program segment that calculates the personal attributes or behavioral pattern parameters related to the person using the device, f. a transmitter/receiver to communicate stored and calculated data to or from another device, g. a second program segment that matches and compares stored and calculated data corresponding to the user of the device with corresponding data belonging to a second person and received from the other device, and h. an indicator to display results of data match.

24. A device as recited in claim 23 wherein said stored data includes data related to various areas of interest to the person using the device.

25. A device as recited in claim 23 wherein said first program segment is based, in part, on an algorithm, or algorithms to study or analyze human behavior.

26. A device as recited in claim 23 wherein said second program segment includes an algorithm that calculates the number of common items between data stored and data received for each of a plurality of categories.

27. A device as recited in claim 23 wherein said plurality of push buttons includes push buttons to select answers to questions.

28. A device as recited in claim 27 wherein said questions and answers are stored in computer memory.

29. A device as recited in claim 23 further comprising means to download a plurality of questions and multiple choice answers for storage in computer memory.

30. A device as recited in claim 23 wherein said indicator to display results of data match includes light emitting diodes.

31. A device as recited in claim 30 wherein said light emitting diodes are placed under a replaceable or removable lens.

32. A device as recited in claim 31 wherein said lens comes in various shapes.

33. A device as recited in claim 32 wherein said shapes include a heart, zodiac signs, sport symbols, animal shapes or geometric shapes.

34. A device as recited in claim 23 wherein said indicator to display results of data match includes a loudspeaker that generates sound effects.

35. A device as recited in claim 23 wherein said housing comes in a plurality of shapes.

36. A device as recited in claim 35 wherein said plurality of shapes includes two parts that when put together will result in a singular form or shape.

37. A device as recited in claim 36 wherein said singular form or shape is configured as a symmetrical egg, a sphere, a heart, a disc, a pyramid, a sport symbol, a zodiac symbol or a cube.

38. A device as recited in claim 23 wherein said indicator consists of a Liquid Crystal Display.

39. A device as recited in claim 38 wherein said Liquid Crystal Display is also used to display questions and multiple choice answers.

40. A device as recited in claim 38 wherein said Liquid Crystal display is also used to display messages and/or results of the data match.

41. A device as recited in claim 23 wherein said second program segment includes an algorithm that calculates the number of common items between desired and derived personality attributes.

42. A device for determining a degree of compatibility between a first set of data corresponding to a first person and a second set of data corresponding to a second person comprising:

a. a housing, b. a plurality of entry control mechanisms to operate the device, c. computer memory to store user's data, d. means to communicate data to and from another device, e. a microprocessor to control the operation of the device, f. a control program to produce user's personality attributes, or behavioral pattern parameters, using a personality profile system to process stored user's data, and to match stored and processed data with data corresponding to a second user and received from another device, and to calculate a degree of compatibility between the two users, based in part on the number of common items between desired and calculated attributes or parameters, and g. a liquid crystal display, or light emitting diodes display, to indicate said degree of compatibility between the two users.

43. A device as recited in claim 42 further comprising stored questions and multiple-choice answers.

44. A device as recited in claim 42 wherein said plurality of entry control mechanisms is used to select answers to questions.

45. A device as recited in claim 42 further comprising means to download a plurality of questions and multiple choice answers for storage in computer memory.

46. A device for determining a degree of compatibility between a first set of data corresponding to a first person and a second set of data corresponding to a second person comprising:

a. a processor to control the device, b. computer memory to store a plurality of questions, multiple-choice answers, user's personal data or information, and a plurality of desired personality attributes, c. entry control mechanisms to select answers and operate the device, d. liquid crystal display to present questions, e. means to communicate information to and from another device, f. a control program executed on processor to determine personality attributes of the user, and compare stored and calculated information with information received from another device, and determine a degree of compatibility between the two sets of data by matching desired personality attributes with calculated attributes, and g an indicator to display said degree of compatibility.

47. A device as recited in claim 46 further comprising a housing.

48. A device as recited in claim 47 further comprising means to preserve electrical energy.

49. A device as recited in claim 46 wherein said questions, answers and user's personal information are related to the user's age, gender, marital status, hobbies, education level, habits, self assessment attributes, religion or political affiliation.

50. A device as recited in claim 46 wherein said indicator to display the degree of compatibility includes light emitting diodes.

51. A device as recited in claim 46 wherein said indicator to display degree of compatibility includes a loudspeaker that generates a plurality of sound effects.

52. A device for determining compatibility between a first set of data corresponding to a first person and a second set of data corresponding to a second person comprising:
   a. a housing,
   b. computer memory to store a plurality of questions, multiple-choice answers, including user's personal data,
   c. entry control mechanisms to select answers and operate the device,
   d. a transmitter/receiver to communicate data to and from another device,
   e. a control program executed on processor to calculate a plurality of attributes describing the personality of the user, to determine common items of interest between stored and calculated personal data and data received from another device, and to predict compatibility between the two sets of data, and
   f. an indicator to indicate that there are common items of interest, or to indicate compatibility between the two sets of data.

53. A device as recited in claim 52 further comprising a liquid crystal display to present questions.

54. A device as recited in claim 52 wherein said indicator includes a loudspeaker that generates sound.

55. A device as recited in claim 52 wherein said indicator includes light emitting diodes.

56. A device as recited in claim 52 wherein said indicator also indicates a measure of number of common items of interest.

57. A device as recited in claim 52 wherein said determination of common items of interest includes the determination if there are identical answers to multiple-choice questions between stored personal data and data received from other device.

58. A device as recited in claim 57 wherein said indicator also indicates the number of common or identical answers.

59. A device as recited in claim 52 wherein said calculation of plurality of attributes is based on a personality profile system.

60. A device as recited in claim 59 wherein said determination of common items of interest includes the determination if the users of the two devices have a common or similar personality.

61. A device as recited in claim 60 wherein said indicator indicates the degree to which the two personalities are similar or different.

62. A device for determining a degree of compatibility between a first set of data corresponding to a first person and a second set of data corresponding to a second person comprising two main elements defined as a base and a portable part, wherein the base includes a housing for the base, a plurality of entry control mechanisms, and an LCD screen, and wherein the portable part includes:
   a. a housing for the portable part,
   b. computer memory to store user's data that includes desired personal attributes,
   c. a micro-processor to control the operation of the device,
   d. a first program segment, which is controlled by entry control mechanisms in the base, to calculate personal attributes of the user from user's stored data prior to matching user's data with corresponding data belonging to a second user and received from another device,
   e. means to communicate data to and from another device,
   f. a second program segment to match stored and calculated data with data received from the other device,
   g. a mechanism to activate said second program segment, and
   h. indicator to display results of matching the two sets of data.

63. A device as recited in claim 62 wherein said portable part can be worn as a necklace or ornament, or can be connected to a key chain.

64. A device as recited in claim 62 wherein said housing for the portable part is shaped as a heart, zodiac sign, sport symbol, fruit, geometric shape or animal.

65. A device as recited in claim 62 wherein said indicator to display results of data match includes a plurality of light emitting diodes.

66. A device as recited in claim 65 wherein said light emitting diodes are in different colors.

67. device as recited in claim 62 wherein said indicator to display results of data match includes a loudspeaker that generates sound effects.

* * * * *